United States Patent [19]

Bruhnke et al.

[11] Patent Number: 5,660,433
[45] Date of Patent: Aug. 26, 1997

[54] ARM REST FOR A PASSENGER VEHICLE

[75] Inventors: Ulrich Bruhnke, Ehningen; Bernd Geier, Grafenau; Hermann Gross, Magstadt, all of Germany

[73] Assignee: Mercedes-Benz AG, Stuttgart, Germany

[21] Appl. No.: 624,899

[22] Filed: Mar. 27, 1996

[30] Foreign Application Priority Data

Mar. 27, 1995 [DE] Germany ............. 195 11 135.4

[51] Int. Cl.⁶ ..................................... A47C 7/62
[52] U.S. Cl. ............... 297/188.17; 297/411.32; 297/188.16; 312/334.46; 224/281; 224/926
[58] Field of Search ............. 297/188.14, 188.15, 297/188.16, 188.17, 411.32; 224/926, 281; 312/334.46

[56] References Cited

U.S. PATENT DOCUMENTS

| | | | |
|---|---|---|---|
| 3,116,849 | 1/1964 | Brewer et al. | 248/311.2 X |
| 3,508,732 | 4/1970 | Trachtenberg et al. | 224/926 X |
| 4,040,659 | 8/1977 | Arnold. | |
| 4,809,897 | 3/1989 | Wright, Jr. | 224/926 X |
| 5,018,633 | 5/1991 | Toth et al. | 224/926 X |
| 5,072,989 | 12/1991 | Spykerman et al. | |
| 5,150,946 | 9/1992 | Marfilius et al. | 297/188.15 |
| 5,232,262 | 8/1993 | Tseng | 297/188.17 |
| 5,246,269 | 9/1993 | DeBoer et al. | |
| 5,253,838 | 10/1993 | Spykerman | 297/188.17 X |
| 5,297,767 | 3/1994 | Miller et al. | |
| 5,372,403 | 12/1994 | Puerto | 297/188.17 |
| 5,427,447 | 6/1995 | Satoh | 297/188.17 X |
| 5,487,519 | 1/1996 | Grabowski | 248/311.2 |
| 5,489,054 | 2/1996 | Schiff | 297/188.17 X |

FOREIGN PATENT DOCUMENTS

| | | | |
|---|---|---|---|
| 89 03 393.3 | 6/1989 | Germany. | |
| 6211082 | 8/1994 | Japan | 224/281 |
| 6305364 | 11/1994 | Japan | 224/281 |

Primary Examiner—Peter R. Brown
Assistant Examiner—David E. Allred
Attorney, Agent, or Firm—Evenson McKeown Edwards & Lenahan, PLLC

[57] ABSTRACT

An arm rest is disclosed for a vehicle seat, in particular a pivotable central support for the rear seat bench of a passenger car. The arm rest has a padded body and a pull-out part which is integrated in said padded body, which pullout part can be pulled out on an end side and on being pulled out releases a drinking vessel holder. In order to enable more extensive use of the arm rest to accommodate mobile objects, the pull-out in which latching part can be secured in a first pull-out stage, the drinking vessel holder is exposed, using a latching assembly. An upwardly open compartment is arranged in the pull-out part, in the pull-out direction behind the drinking vessel holder. This compartment is exposed, after the latching assembly has been overcome, by further pulling out of the pull-out part in a second pull-out stage determined by an end stop.

20 Claims, 5 Drawing Sheets

ARM REST FOR A PASSENGER VEHICLE

BACKGROUND AND SUMMARY OF THE INVENTION

The invention relates to an arm rest for a vehicle seat, in particular a pivotable central support for a bench seat of a passenger car with a padded body and a pull-out part-integrated into the padded part and serving to release a drinking vessel holder.

In the case of a known arm rest or arm support of general this general type disclosed in U.S. Pat. No. 4,040,659, the pullout part is designed as an elongate hollow box profile which is closed on the end side and is held in an axially displaceable manner in a guide shaft having a matching box cross-section. When the pull-out part, the pull-out path of which is limited by an end stop, is pulled out to the full extent, the drinking vessel holder or so-called cup holder protrudes freely in front of the end side of the arm rest and releases two circular depressions which are arranged one behind the other in the pull-out direction and are intended for the insertion of beaker-like drinking vessels.

An arm rest which is of similar design and is provided as a pivotable central support for the rear seat bench of a passenger car is disclosed in U.S. Pat. No. 5,246,269.

German Utility Model 89 03 383 describes an arm rest for a motor vehicle seat which, in order to increase the storage space available in the passenger compartment, contains a drawer which can be pulled in the longitudinal direction out of the arm rest for the removal or insertion of utensils of any type, and in the process releases an upwardly open compartment.

It is known from German Patent Document DE 26 05 449 A1 to accommodate a first-aid box in the arm rest, the arm rest having, for this purpose, an appropriately sized loading compartment which can be closed by means of a padded pivoting lid.

An object of the invention is to enable more extensive use of an arm rest having an integrated cup holder of the type mentioned at the beginning in order to accommodate mobile objects.

This object is achieved, according to the invention, in the case of an arm rest for a vehicle seat of the generic type defined above by providing an arrangement wherein the pullout part can be secured by a latching assembly in a first pull-out stage in which the drinking vessel holder is exposed, wherein an upwardly open compartment, preferably for holding a first-aid bag, is arranged in the pull-out part in the pull-out direction behind the drinking vessel holder, said compartment being exposable in a second pullout stage after the latching assembly has been overcome, and wherein the second pull-out stage is limited by an end stop.

The arm rest according to the invention has the advantage of providing a compartment for objects in addition to the cup holder. This compartment is provided, in particular, for accommodating the first-aid box which is generally stored anywhere in the boot or in the interior of the vehicle and constantly gets in-the way. Accommodating the first-aid box in the arm rest has the advantage that it is always to be found at the same place, is rapidly accessible and always ready to use. When the pull-out part is pulled out in order to use the cup holder the compartment is not released since owing to the latching assembly provided, increased tensile forces have to be applied in order to overcome the cup holder position and to expose the compartment. The compartment is hence only accessible by a deliberate act, when there is an actual need to open it.

Other objects, advantages and novel features of the present invention will become apparent from the following detailed description of the invention when considered in conjunction with the accompanying drawings.

DETAILED DESCRIPTION OF THE DRAWINGS

Figure 1:
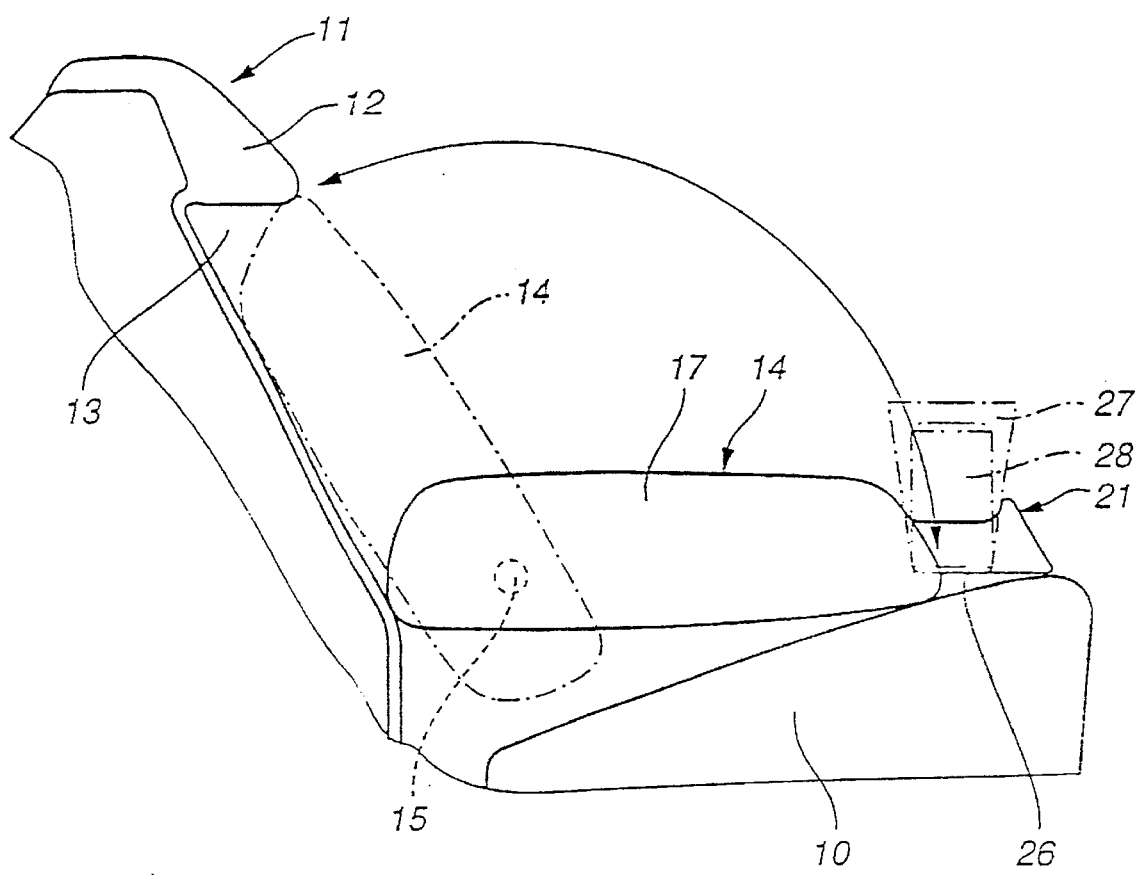
FIG. 1 is a schematic a side view of a rear seat bench with a pivotable central arm rest, constructed according to a preferred embodiment of the present invention.

In FIG. 1, a vehicle seat cushion 10 is schematically illustrated along with a the backrest 11 of a rear seat bench of a passenger car. The cushion 12 of the backrest 11 has a cutout 13 which is arranged in the center of the cushion 12 and in which a central arm rest 14 is inserted in a flush manner. The arm rest 14 is held on the backrest 11 in a manner which allows it to pivot around a horizontal pivot axis aligned transversely with respect to the seat depth, the pivot axis being realized by two bearing journals 15, 16 (FIG. 4) which are held in pivot bearings in the backrest 11 (not shown here). In FIG. 1, the bearing journal 15 is indicated schematically by dashed lines.

Figure 2:
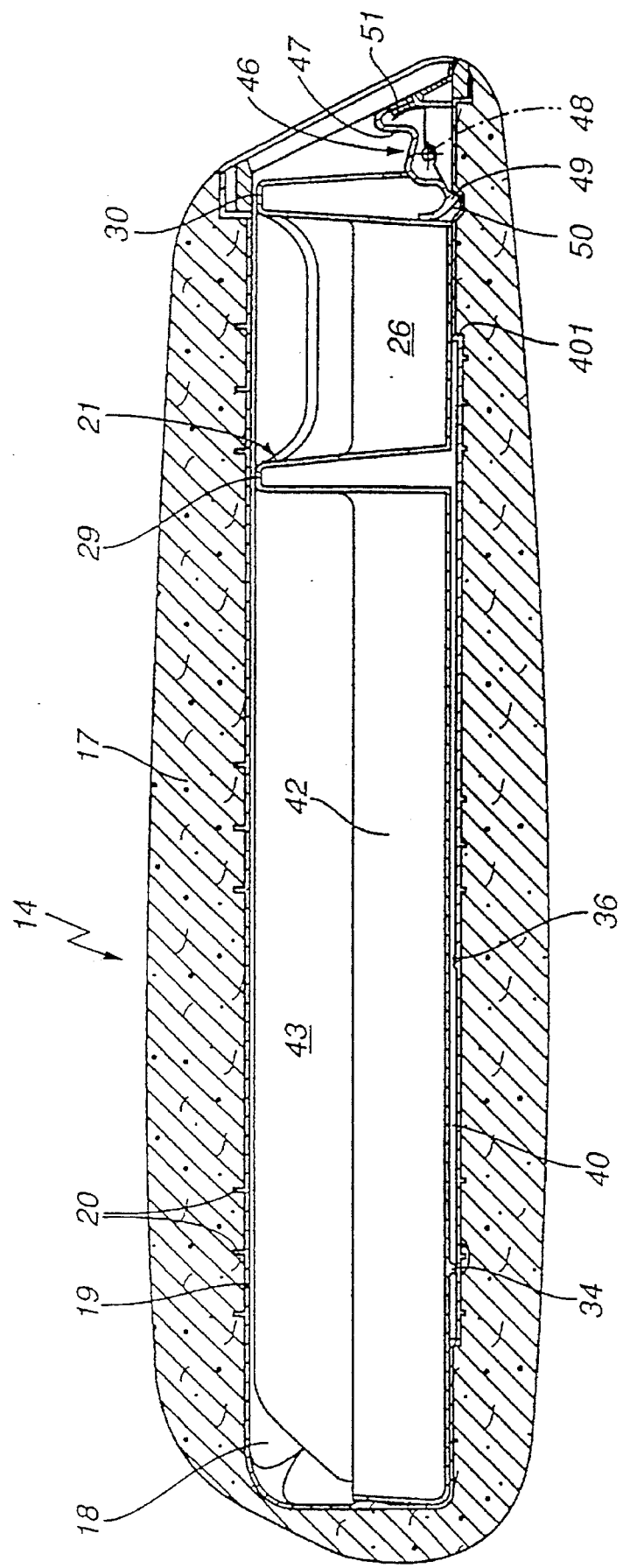
FIG. 2 is a longitudinal sectional view of the arm rest of FIG. 1.

The arm rest 14 has a padded body 17 having a cavity 18 which extends in the longitudinal or axial direction, i.e. transversely with respect to the pivot axis of the arm rest and opens out freely in the end side of the padded body 17 (FIG. 2). A guide shaft 19, which is made of plastic, is inserted in a form-fitting manner into the cavity 18 and is secured against axial displacement via a multiplicity of webs 20 in the padded body 17, which webs protrude on the outer walls of the guide shaft 19. As can be seen from FIG. 4, the guide shaft 19 has a rectangular hollow box profile, the two bearing journals 15, 16 for the pivot mounting of the arm rest 14 on the backrest 11 being integrally molded onto the two side walls of guide shaft 19.

Figure 4:
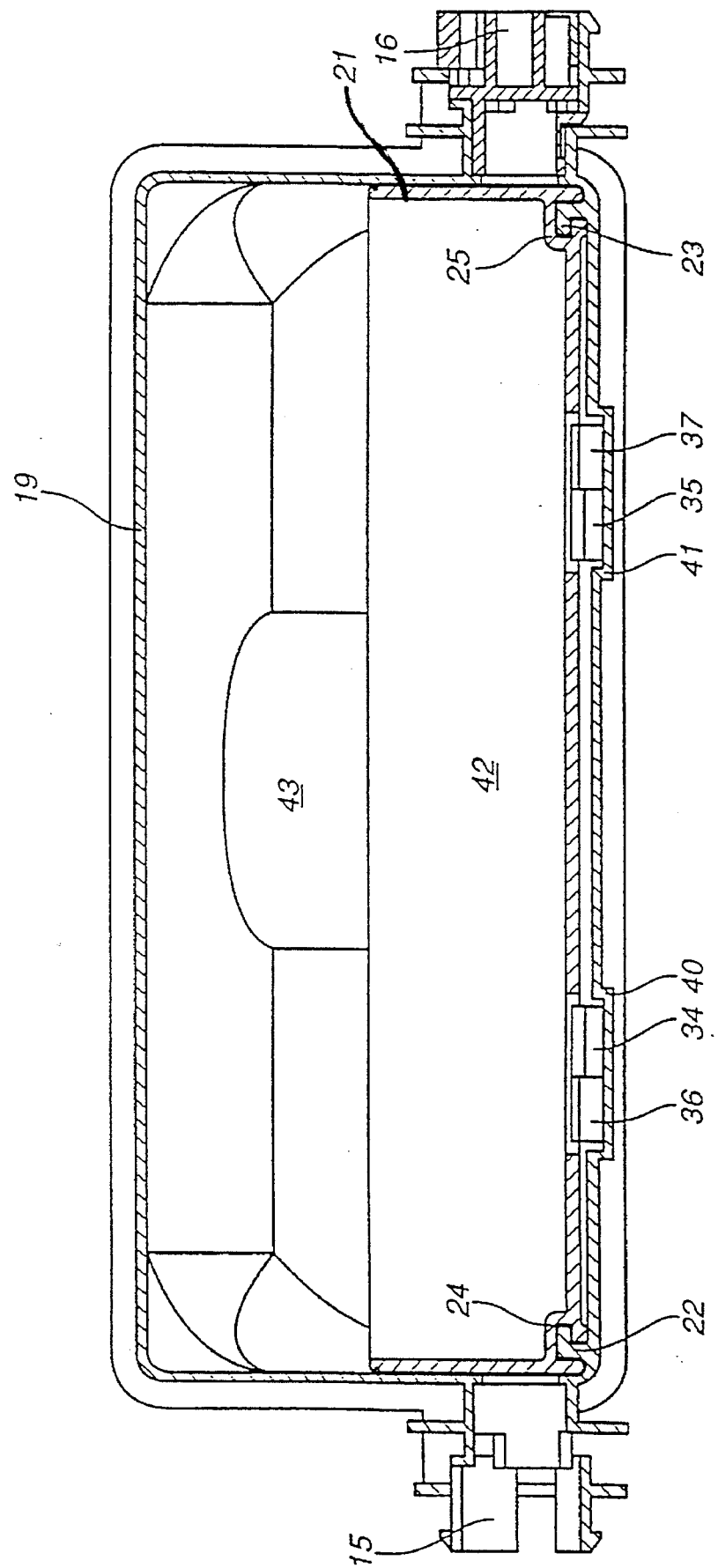
FIG. 4 is a sectional along the line IV—IV in FIG. 3.

In the guide shaft 19, a pull-out part 21 is guided in an axially displaceable manner, for which purpose there protrude axially, on the base of the guide shaft 19, two slide rails 22, 23 which extend axially spaced apart in parallel and over which C-shaped elongate profiles 24, 25, which are formed in the base of the pull-out part 21, engage (FIG. 4). The pull-out part 21 is likewise manufactured from plastic, the elongate profiles 24, 25 being integrally formed thereon at the same time during the production process, in the same way as the slide rails 22, 23 are on the guide shaft 19.

Figure 5:
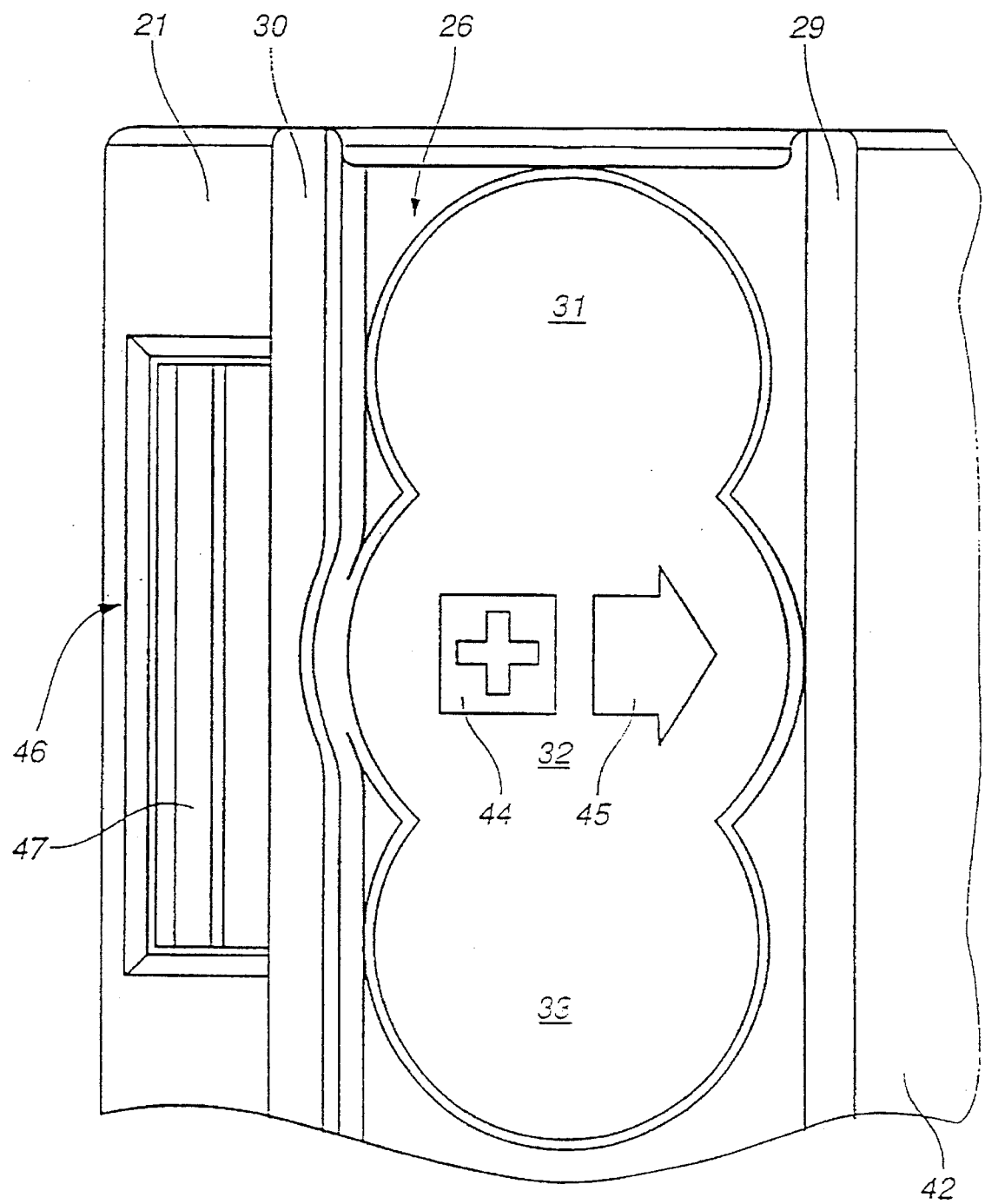
FIG. 5 is a plan view of a cup holder in the pullout part according to FIG. 2.

The pull-out part 21 can be secured in a first pull-out stage, in which a drinking vessel holder 26 is exposed, using a latching assembly. This first pull-out stage is illustrated in FIG. 1, the holding of a drinking beaker 27 or of a can of drink 28 in the drinking vessel holder 26, also called cup holder, being indicated in FIG. 1 by dot-dash lines. As can be seen enlarged in FIG. 2, and particularly clearly in FIG. 5, the drinking vessel holder 26 is arranged in the pull-out part 21 between two hollow transverse walls 29, 30 which extend transversely with respect to the pull-out direction. Arranged between the two transverse walls 29, 30 are three depressions 31, 32, 33 which lie one next to the other transversely with respect to the pull-out direction and partly merge one into the other. As is indicated in FIG. 1, at least two drinking vessels can be inserted into these depressions 31–33 and are stably retained therein.

Figure 3:
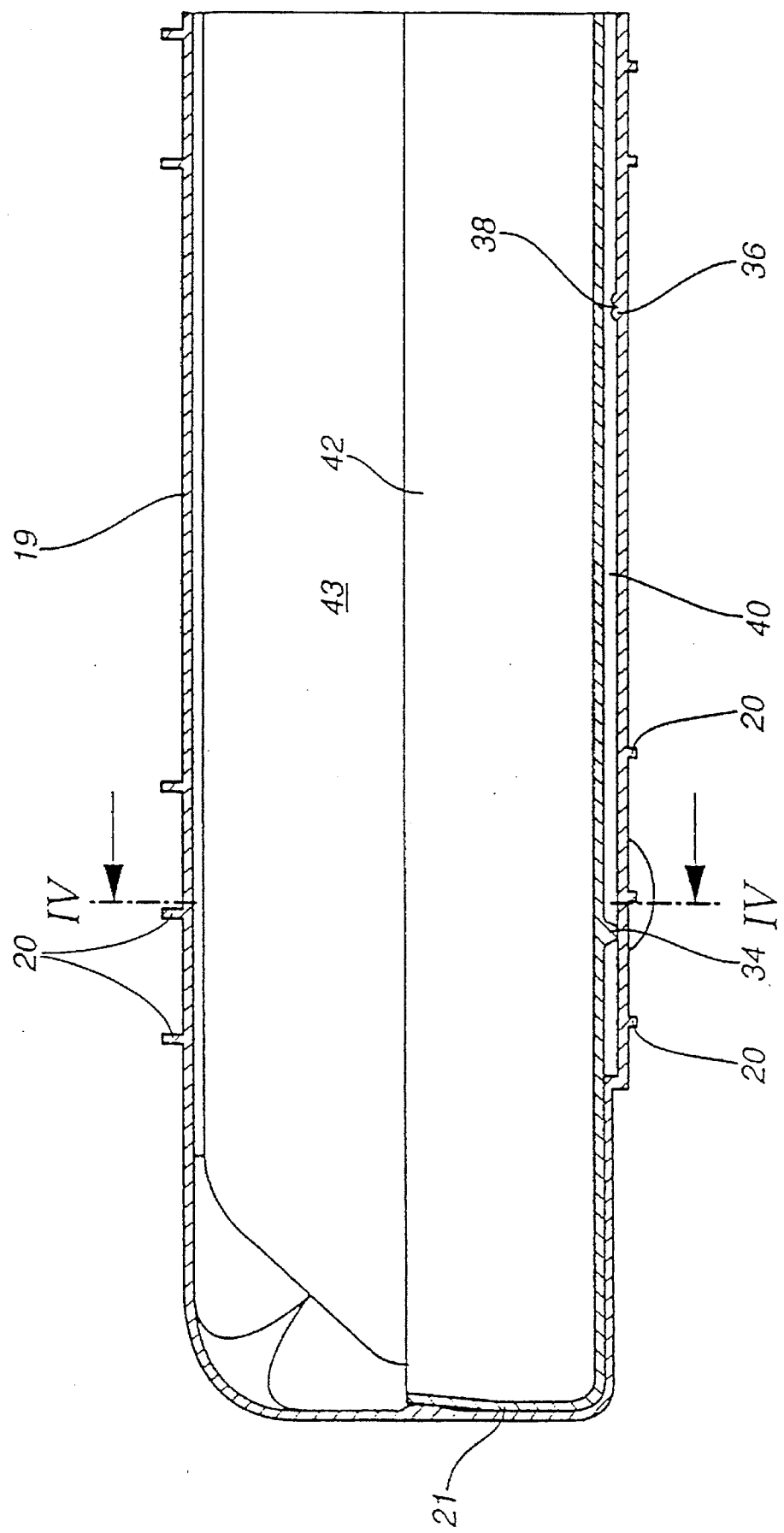
FIG. 3 is an enlarged illustration, in longitudinal section, of the rear portion of a guide shaft with a pullout part, integrated in the arm rest according to FIG. 2.

As can be seen in FIG. 2 and more clearly in FIGS. 3 and 4, the latching assembly for securing the pullout part 21 in the first pull-out stage which releases the cup holder 26 comprises two latching tongues 34, 35 which protrude downwards on the outside of the base of the pull-out part 21, and two latching humps 36, 37 which are respectively assigned to a latching tongue 34 or 35 and in which there is provided in each case a latching hollow 38 for the springing-in of the assigned latching tongue 34 or 35. Looking at FIG. 4, it can be seen that each latching hump 36, 37 is arranged in a groove-like longitudinal depression 40 or 41 which extends in the pull-out direction in the base of the guide shaft 19. The two longitudinal depressions 40, 41 are arranged spaced apart from one another in parallel. As can be seen from the longitudinal depression 40 in FIGS. 2 and 3, each longitudinal depression 40, 41 is closed at the front and rear end. The front end of the longitudinal depressions 40, 41 (identified in FIG. 2 by 401) at the same time forms, together with the latching tongues 34, 35, an end stop for the pull-out movement of the pull-out part 21 out of the guide shaft 19.

In the pull-out part 21, behind the cup holder 26, seen in the pull-out direction, there is provided an upwardly open compartment 42 for holding objects of any type. This compartment 42 is preferably designed in such a manner that a standardized first-aid bag 43 may be placed therein with little clearance. If the pull-out part 21, which is located in its first pull-out stage (FIG. 1), is now, after the latching forces of the latching assembly 34–38 have been overcome, pulled out further as far as the end stop, the rear compartment 42 is sufficiently exposed for it to be possible for the first-aid bag 43 to be removed from the compartment 42 or to be inserted back into the compartment 42. In order to make it easier to find the first-aid bag 43, a first-aid symbol 44 and an arrow symbol 45 pointing in the direction of the first-aid bag 43 are stuck onto the base of the central depression 32 of the cup holder 26 (FIG. 5), or are structured by embossing.

The pull-out part 21, which has been completely inserted into the guide shaft 19 and in doing so closes the front push-out opening of the guide shaft 19, is locked in this insertion position by means of a latching device 46 on the guide shaft 19. As can be seen in FIG. 2, the latching device 46 has for this purpose a springloaded actuating lever 47 which is held on the pull-out part 21 in a manner which allows it to pivot about a pivot point 48 and engages with a hook-shaped lug 49 into a cutout or depression 50 in the base of the guide shaft 19 and in the process is supported at the same time in a prestressed manner on the cup holder 26 since the rear wall of the compartment 42 bears against the associated wall of the guide shaft 19. As a result, it is not possible for noises to occur when the vehicle is in operation.

To release the latching device 46, the actuating lever 47 is slightly pivoted in the clockwise direction, by means of finger pressure, counter to the force of its spring 51, in FIG. 2, as a result of which the lug 49 comes out of the depression 50 and the pull-out part 21 can now be pulled out in the longitudinal direction.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A seat arm rest comprising:

a body, a cavity in said body, a pull out part movably supported in said cavity, said pull out part having a drinking vessel holder and an upwardly open stowage compartment spaced from the vessel holder, wherein said body and pull out part are provided with a first latch assembly holding said pull out part in a closed position, a second latch assembly holding said pull out part in a first partly open position with said drinking vessel holder exposed, and a stop holding said pull out part in a second fully open position with said stowage compartment exposed, wherein said second latch assembly includes interengaging parts which are disengageable in response to predetermined forces in the pull out part.

2. A seat arm rest according to claim 1, wherein the pull-out part is guided in a displaceable manner in a box-like guide shaft which is held in a non-displaceable manner in the cavity in the body, said guide shaft having two slide rails which extend longitudinally in an axial direction of the guide shaft and are spaced apart and parallel to one another, two elongate profiles on the pull-out part slidably engaging said slide rails during pull out movement of the pull out part.

3. A seat arm rest according to claim 2, wherein the interengaging parts of the second latching assembly include at least one resilient latching tongue protruding downwards on the pull-out part, and at least one latching bump which protrudes upwards on a base of the guide shaft and has a latching hollow into which the latching tongue is able to snap.

4. A seat arm rest according to claim 3, wherein the at least one latching hump is arranged in a groove-like longitudinal depression which extends in the pull-out direction in the base of the guide shaft, and wherein an end of the longitudinal depression which faces a pull-out opening of the guide shaft forms the stop.

5. A seat arm rest according to claim 4, wherein laterally projecting bearing journals for pivotable arrangement of the arm rest on a vehicle are arranged on the guide shaft.

6. A seat arm rest according to claim 3, wherein laterally projecting bearing journals for pivotable arrangement of the arm rest on a vehicle are arranged on the guide shaft.

7. A seat arm rest according to claim 2, wherein the drinking vessel holder has three circular depressions disposed side by side transversely with respect to a pull-out direction of said pull out part, said depressions partially merging one into the other and serving for holding drinking vessels, such as beakers and cans of drinks.

8. A seat arm rest according to claim 2, wherein laterally projecting bearing journals for pivotable arrangement of the arm rest on a vehicle are arranged on the guide shaft.

9. Arm rest according to claim 8, wherein the pull-out part and the guide shaft are made of plastic and the elongate profiles, slide rails and the bearing journals are each integrally formed thereon.

10. A seat arm rest according to claim 2, wherein said first latch assembly includes a spring loaded actuating lever carried by the pull out part and a depression in the guide shaft engageable with the spring loaded actuating lever.

11. A seat arm rest according to claim 1, wherein the drinking vessel holder has three circular depressions disposed side by side transversely with respect to a pull-out direction of said pull out part, said depressions partially merging one into the other and serving for holding drinking vessels, such as beakers and cans of drinks.

12. A seat arm rest according to claim 11, wherein bearing journals are provided for pivotally supporting said arm rest adjacent a bench seat of a vehicle.

13. A seat arm rest according to claim 11, wherein said stowage compartment is a first aid kit stowage compartment, and wherein said pull out part includes visible indicia of said first aid kit location.

14. A seat arm rest according to claim 11, wherein the second latching assembly includes a resilient latching tongue carried by the pull out part and a latching hump fixed to the body and engageable with the resilient latching tongue.

15. A seat arm rest according to claim 11, wherein said body is pivotally supported at a vehicle seat for movement between a stowed closed position and a passenger access position.

16. A seat arm rest according to claim 15, wherein said body is provided with padding conforming to adjacent vehicle seat padding when said body is in the stowed closed position.

17. A seat arm rest according to claim 16, wherein said stowage compartment is a first aid kit stowage compartment, and wherein said pull out part includes visible indicia of said first aid kit location.

18. A seat arm rest according to claim 1, wherein said first latch assembly includes a spring loaded actuating lever carried by the pull out part.

19. A seat arm rest according to claim 18, wherein the drinking vessel holder has three circular depressions disposed side by side transversely with respect to a pull-out direction of said pull out part, said depressions partially merging one into the other and serving for holding drinking vessels, such as beakers and cans of drinks.

20. A seat arm rest according to claim 18, wherein said body is provided with padding conforming to adjacent vehicle seat padding when said body is in a stowed position.

* * * * *